(12) United States Patent
Steele et al.

(10) Patent No.: US 7,874,222 B2
(45) Date of Patent: Jan. 25, 2011

(54) TWO-SPEED PTO STUB SHAFT EXCHANGE IMPROVEMENTS

(75) Inventors: David M. Steele, Waterloo, IA (US); John A. Weihs, Hudson, IA (US); Allan N. Schott, Reinbeck, IA (US); Daniel J. Fox, Elma, IA (US); Wade T. Larson, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 652 days.

(21) Appl. No.: 11/737,168

(22) Filed: Apr. 19, 2007

(65) Prior Publication Data
US 2008/0257078 A1 Oct. 23, 2008

(51) Int. Cl.
*F16H 37/00* (2006.01)
(52) U.S. Cl. .......................... 74/15.4; 74/15.6
(58) Field of Classification Search ............ 74/11, 74/15.4, 15.6; 403/359.5, DIG. 7
See application file for complete search history.

(56) References Cited

U.S. PATENT DOCUMENTS

| | | | |
|---|---|---|---|
| 3,352,165 A * | 11/1967 | Lee | .................. 74/15.4 |
| 3,464,277 A | 9/1969 | Longshore | |
| 3,669,229 A | 6/1972 | Ronayne et al. | |
| 3,715,704 A | 2/1973 | Boyle et al. | |
| 4,287,778 A | 9/1981 | Quick | |
| 4,722,234 A | 2/1988 | Greene et al. | |
| 5,667,330 A | 9/1997 | Henkel et al. | |
| 6,854,541 B2 | 2/2005 | Matufuji et al. | |

FOREIGN PATENT DOCUMENTS

EP 1 103 407 5/2001

OTHER PUBLICATIONS

European Search Report, Aug. 5, 2008, 6 Pages.

* cited by examiner

*Primary Examiner*—Richard W Ridley
*Assistant Examiner*—Terence Boes

(57) ABSTRACT

A power take-off assembly for a work vehicle including an improved power take-off shaft for installation and removal. The power take off shaft is extended and a cut out section on the first end of the shaft is provided to engage an extended portion of a spring loaded mechanism. Once the cut out section securely fits over the extended portion, the spring loaded mechanism is prevented from axially moving in a rightward direction, thus enabling the spring to hold the gear collar in place to engage the high speed gear. The PTO stub shaft has an extended end with protruding shoulders which serve to capture the snap ring between the stub shaft and the output shaft so that when the stub is moved axially the shoulders will pull the snap ring into the groove on the output shaft which securely fastens the stub shaft. A cut-out section on the front end surface of the output shaft is also provided to allow clearance for the tool to squeeze the snap ring tabs during installation and removal.

7 Claims, 4 Drawing Sheets

TWO-SPEED PTO STUB SHAFT EXCHANGE IMPROVEMENTS

FIELD OF THE INVENTION

The present invention relates generally to a reversible two speed PTO Stub Shaft, and more specifically to an improved PTO Stub Shaft for a cheaper and efficient installation process.

BACKGROUND OF THE INVENTION

Power Take-Off Shafts or PTOs are used on agricultural vehicles such as tractors to provide power from the engine to agricultural implements. As the use of PTOs developed over the years, the industry developed a standard for two speed PTOs comprising gear speeds of 1000 and 540 rpms. Thus in order to accommodate industry standards of a particular implement relative to the appropriate gear speed, it is necessary to provide a power take-off assembly which allows quick and easy installation of a proper PTO assemblies, the output shaft has a internally splined portion adapted to axially receive the externally splined reversible power take off shaft to prevent relative rotational movement between the power take-off stub shaft and output shaft. The desired PTO shaft speed is typically determined by the configuration of the PTO shaft end inserted into the output shaft. When reversible PTO shafts are used, as in the case of the present invention, the outer end portion is adapted for engagement with the implement for the selected speed, while the configuration of the inner end portion positions a shifting mechanism against the force of a spring loaded mechanism to selectively engage the proper gear speed.

PTO shafts that are described above are often maintained in place by a locking mechanism, typically a flanged locking mechanism, and arranged externally of the output shaft to which the PTO shaft is coupled. One disadvantage of a PTO shaft and current flanged locking mechanisms is that it tends to be tedious and time consuming to install, which may require the use of an additional person or an additional hand.

Other known PTO shafts are maintained in place by an internal snap ring configured to engage an interior portion of the output shaft. Because of the high force required to compress the snap-ring for installation, special tools such as pliers are usually required to reverse the PTO shaft end. To perform the installation using a snap ring, an operator must push the PTO stub shaft to overcome the high axial force of the spring loaded shifting mechanism (e.g. spring loaded plunger), and at the same time install the snap ring.

It therefore remains desirable to provide an improved PTO stub shaft design that will provide for a quick and secure installation of the PTO stub shaft to the output shaft in a desired orientation without the use of pliers.

SUMMARY OF THE INVENTION

In view of the above, and in accordance with one aspect of the present invention, one object of the invention is to improve the installation and removal process of the two speed reversible PTO stub shaft by enhancing the stub shaft design to enable the operator to easily insert the stub shaft into the output shaft against a spring loaded mechanism by twisting the shaft to align the gear collar teeth to the appropriate gear.

Another object of this invention is to quickly and easily install or remove the power take-off shaft by providing a recess on the front interior top end portion of the output shaft to capture or contain the snap ring which is fastened around the PTO stub shaft. This allows the installer to let go of the tool used to squeeze the snap ring and use both hands to insert the stub shaft against the collar return spring and twist the shaft to align the collar teeth to the gear.

A further object of the invention is to extend the end of the stub shaft and add protruding shoulders in order to further capture or contain a snap ring.

Another object of the invention is to modify the output shaft design by providing a cut out section on the front end surface of the output shaft to allow for snap ring tabs clearance.

Additional objects, advantages, and novel features of the invention will become apparent to those skilled in the art upon examination of the following detailed description of the preferred embodiments of the invention when read in conjunction with the accompanying drawings.

DESCRIPTION OF THE PREFERRED EMBODIMENT

Figure 1:
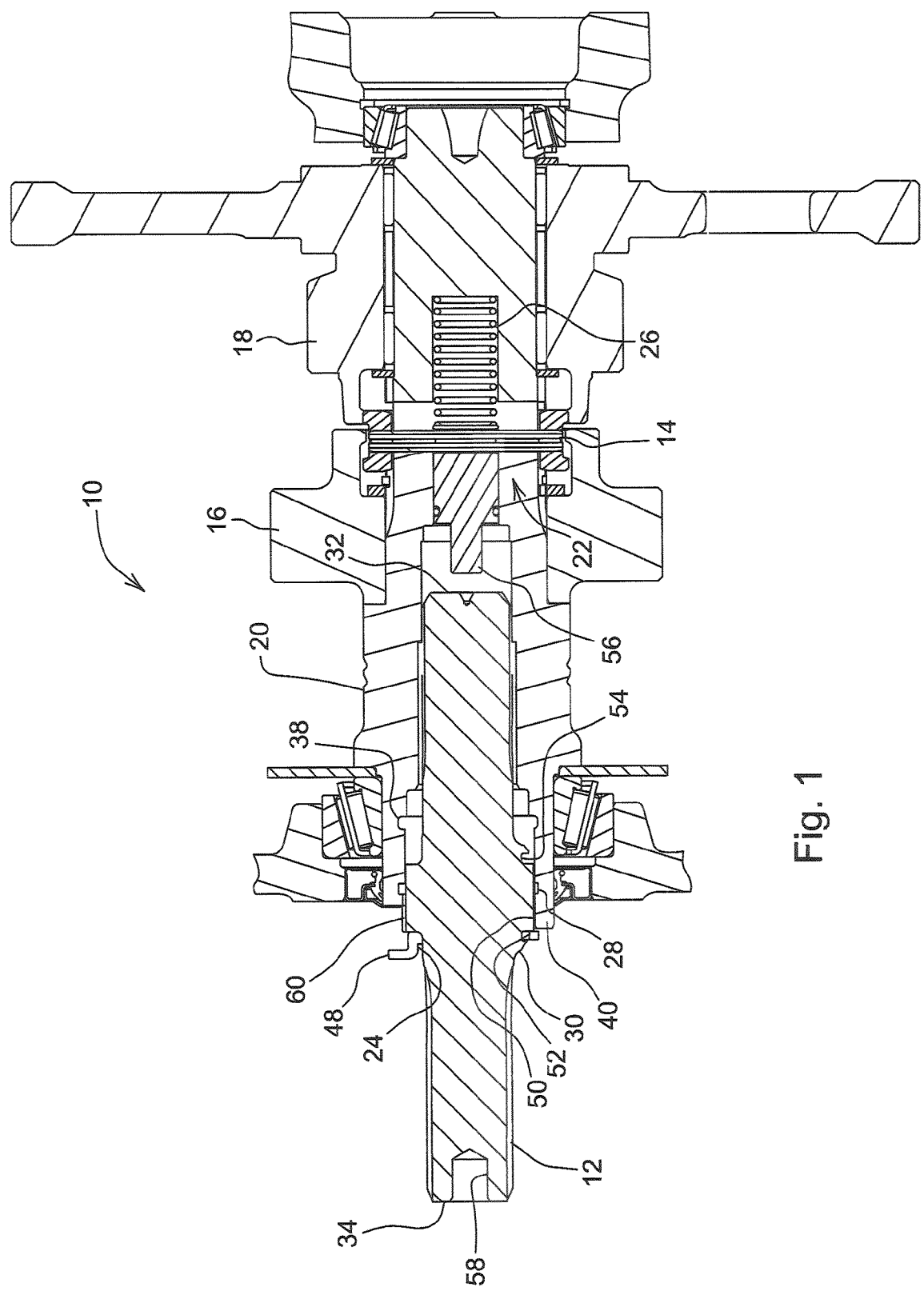
FIG. 1 is a cross-sectional view of a power take-off assembly showing the installation of a reversible power take-off shaft oriented for operation at a speed of 1000 rpm.

While the present invention is susceptible of embodiments in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals refer to like parts throughout the several views, there is shown in FIG. 1 a PTO assembly 10. A gear collar 14 is located between a first gear 16 and a second gear 18 and is capable of sliding axially between a first speed and a second speed, respectively 1000 rpm and 540 rpm.

Figure 2:
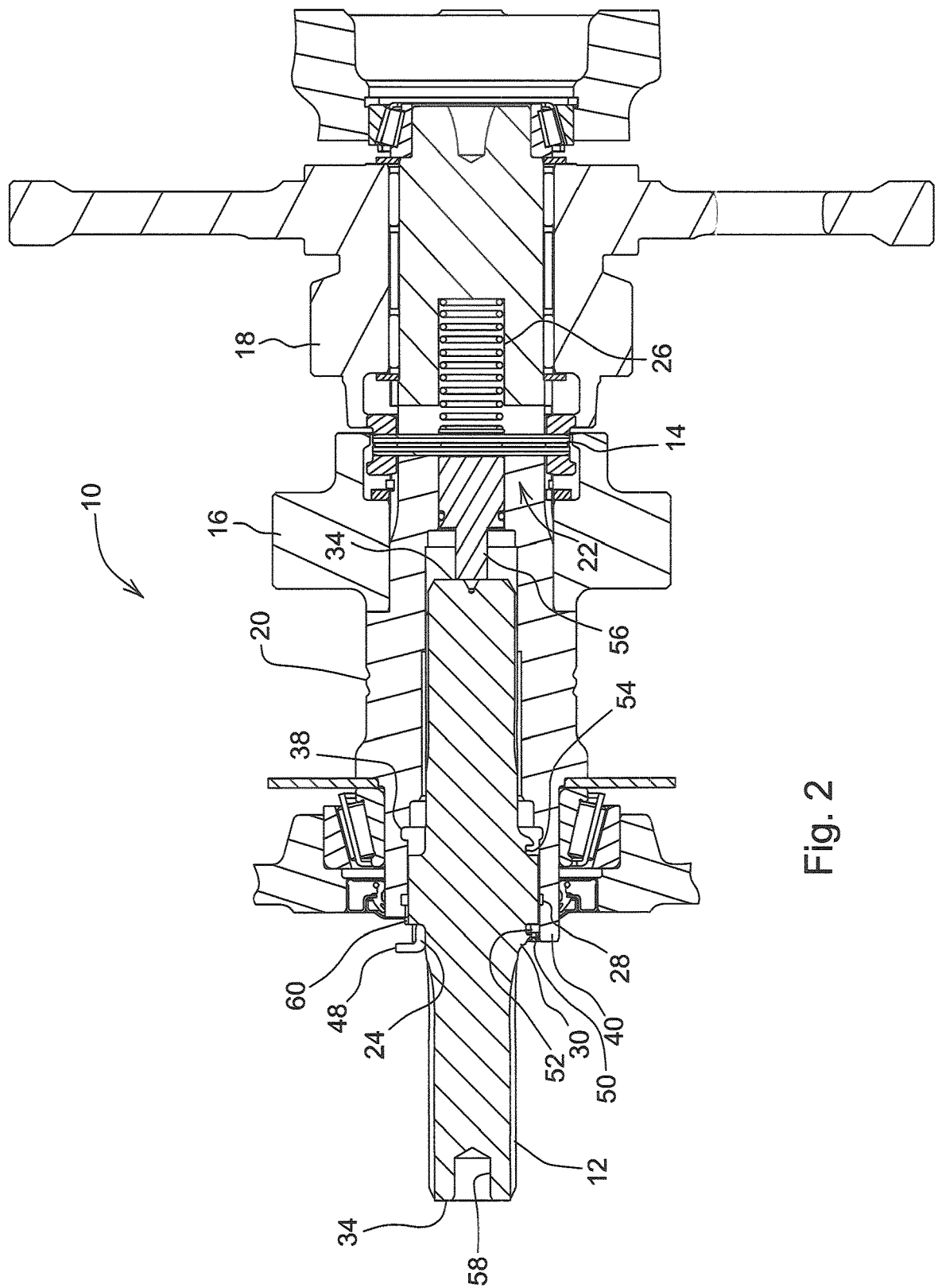
FIG. 2 is cross-sectional view of a power take-off assembly showing the installation of the reversible power take-off shaft right before it engages the protruding shoulders.
Figure 3:
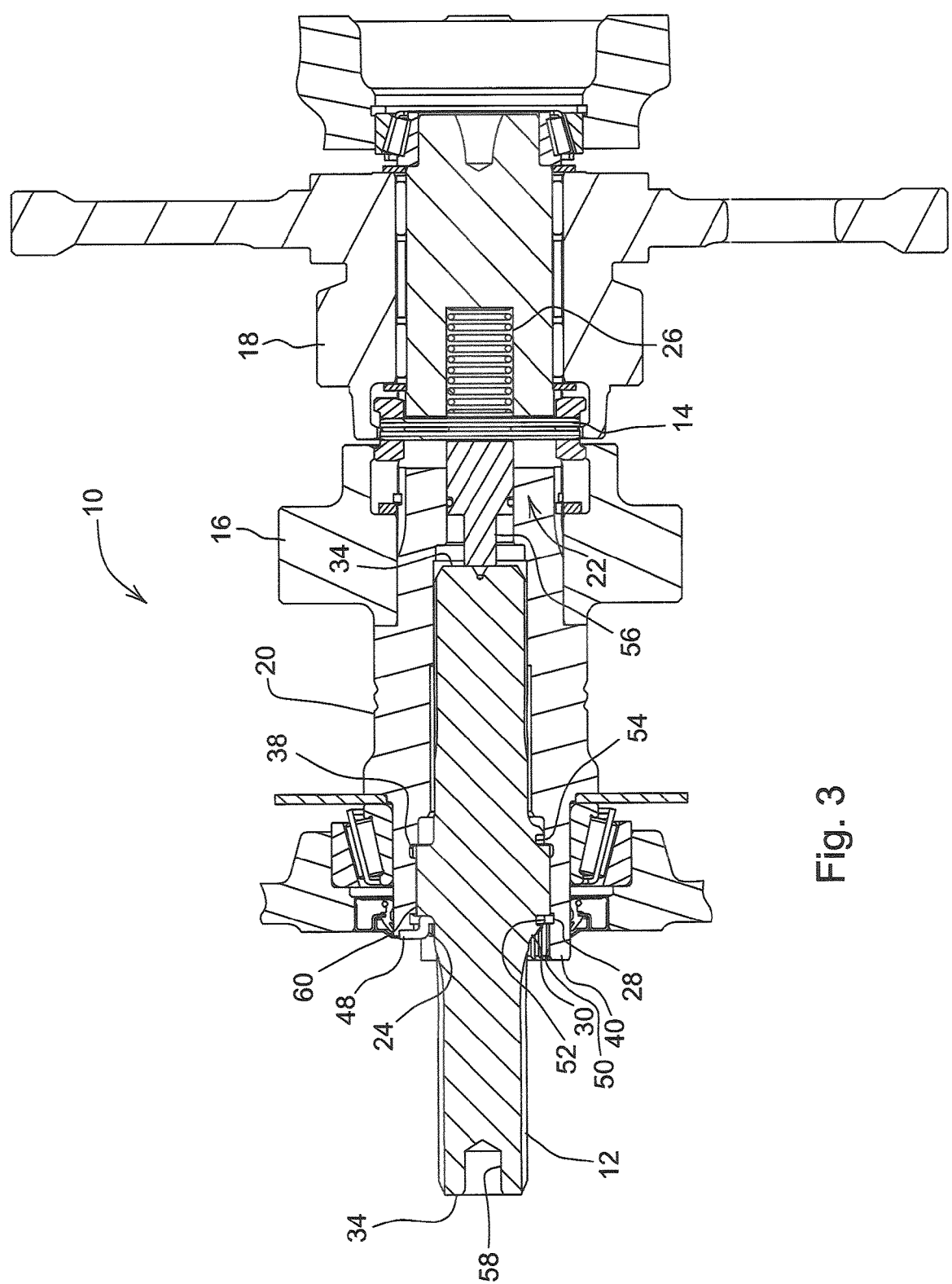
FIG. 3 is a cross-sectional view of a power take-off assembly showing a fully engaged reversible PTO stub shaft.

FIGS. 1-3 show a snap ring 24 fastened around the outer surface of a PTO stub shaft 12. A PTO output shaft 20 has an internal spline 38 and an installation surface 50. The PTO stub shaft 12 has a first recess 52 and an external spline 60, wherein the external spline 60 engages with the internal spline 38. Once the snap ring 24 is aligned and seated within a PTO output shaft recess 28, the snap ring 24 becomes locked and axial movement of the PTO stub shaft 12 is limited. The PTO stub shaft 12 has a first end 32 and a second end 34. When the first end 32 is installed towards a spring loaded mechanism 22, the first end 32 compresses the spring loaded mechanism 22. However, when the bore 58 is installed towards the spring loaded mechanism 22, the second end 34 does not compress the spring loaded mechanism 22. This is because the shape of the bore 58 is complementary to the shape of a member 56. The spring loaded mechanism 22 comprises a spring 26, the gear collar 14, and the member 56. The spring 26 and the gear collar 14 are in alignment with the PTO output shaft 20. The spring 26 urges the gear collar 14, which is mounted about the PTO output shaft 20, towards the PTO stub shaft 12. The member 56 is between the PTO stub shaft 12 and the gear collar 14, and further, it is concentric with the gear collar 14.

The operation of the foregoing preferred embodiment of the invention will now be described with reference to FIGS. 1 and 3. In FIG. 1, the PTO stub shaft 12 having a preferred extended end of 9mm, is shown at an initial installation point wherein the PTO stub shaft 12 is moved axially until the PTO stub shaft 12 locks into the internal spline 38 of the PTO output shaft 20. The snap ring 24 fastened around the outer surface of the PTO stub shaft 12 is simultaneously seated within the PTO output shaft recess 28. This improved process enables the work vehicle operator or installer to use both hands on the PTO stub shaft 12 to overcome the high force of the spring 26 during installation and force the gear collar 14 proximally or rightward to engage the first speed as shown in FIG. 3 to condition the PTO output shaft 20 and the PTO stub shaft 12 to rotate at the first speed of 1000 rpm. The installation surface 50 extends axially away from the PTO output shaft recess 28 a distance that is further than any other portion of the PTO output shaft 20. When installing the PTO stub shaft 12 to rotate at a first speed, the installation surface 50 and the first recess 52 sandwich the snap ring 24 before the PTO stub shaft 12 compresses the spring loaded mechanism 22. Then, after the PTO stub shaft 12 engages the spring loaded mechanism 22, the snap ring 24 seats in the PTO output shaft recess 28. The length of the PTO stub shaft 12 is determined by how much gripping area is desired by the operator to ease the PTO stub shaft 12 installation and removal processes.

In FIG. 2, the PTO stub shaft 12 does not compress the spring loaded mechanism 22. Still, the PTO stub shaft 12 and the installation surface 50 sandwich and seat the snap rind 24 in the first recess 52. A protruding shoulder 30 is attached near the center of the PTO stub shaft 12 between the first and second ends 32, 34 and acts as a means for limiting the snap ring 24 from moving axially. Further, as shown in FIG. 2, the PTO stub shaft 12 is moved closer to the PTO output shaft recess 28 on the interior bottom surface of the PTO output shaft 20 and the snap ring 24, once aligned, will seat itself within the PTO output shaft recess 28 of the PTO output shaft 20, thereby locking the snap ring 24 and the PTO stub shaft 12 in place to prevent axial movement of the PTO stub shaft 12.

FIG. 3 shows the PTO stub shaft 12 in a locked installation position and oriented to rotate at 540 rpm. In this position, the spring loaded mechanism 22 is fully engaged by the PTO stub shaft 12 and the force of the spring 26 is fully exerted in a leftward axial direction. Once this force is exerted, the internal spline 38 and the PTO output shaft recess 28 on the PTO output shaft 20 both operate to capture the PTO stub shaft 12 and prevent the PTO stub shaft 12 from moving axially.

If it is desired to change the speed by reversing the PTO stub shaft 12, the first end 32 is inserted into the PTO output shaft 20. The operator will compress the snap ring 24 using a tool similar to pliers, and the PTO stub shaft 12 will be removed. The PTO stub shaft 12 comprises a second recess 54. When installing the PTO stub shaft 12 to rotate at a second speed, the installation surface 50 and the second recess 54 sandwich the snap ring 24 before the PTO stub shaft 12 compresses the spring loaded mechanism 22. Then, after the PTO stub shaft 12 engages the spring loaded mechanism 22, the snap ring 24 seats in the PTO output shaft recess 28.

Figure 4:
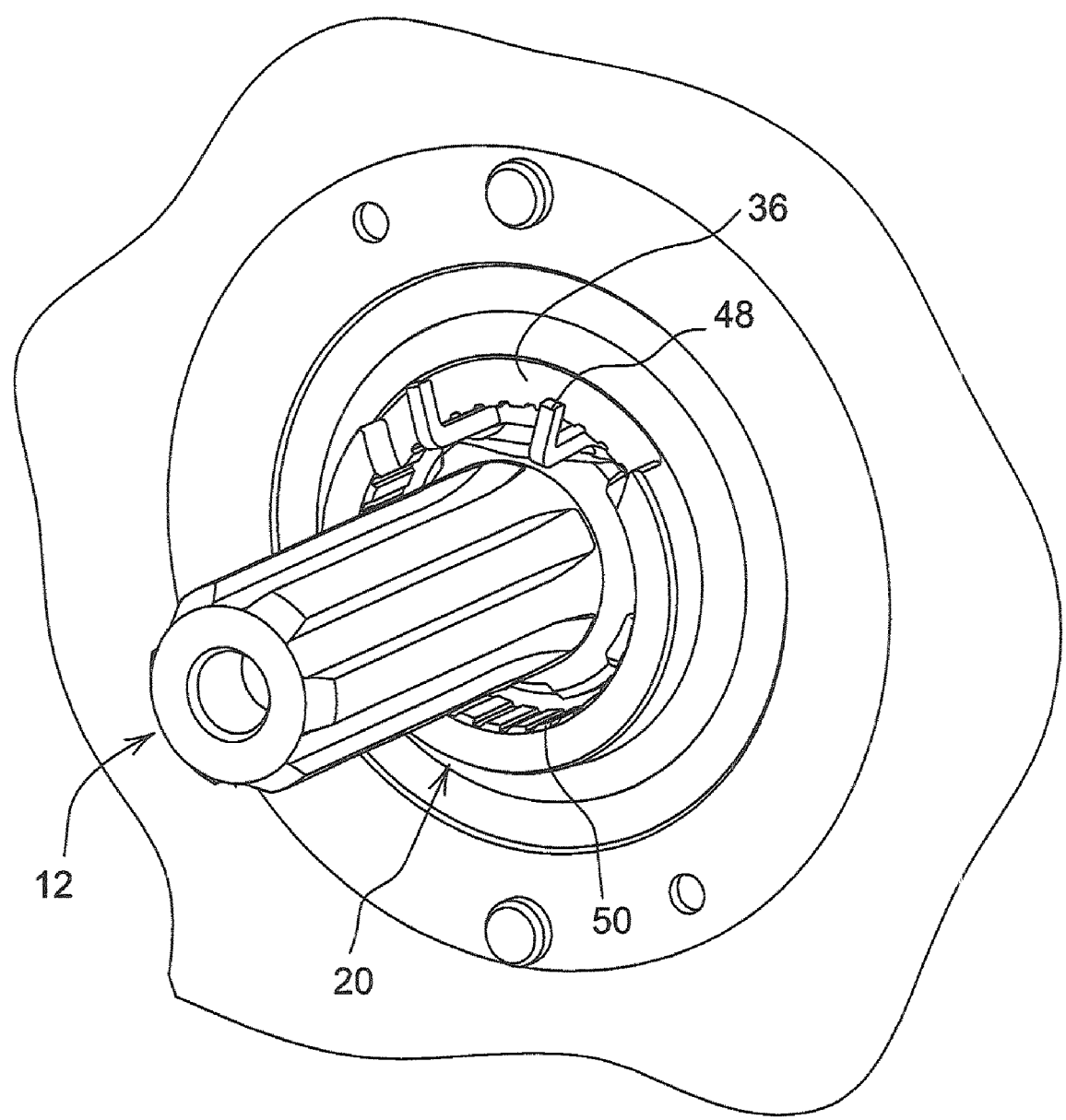
FIG. 4 is a cut out view of an output shaft and a stub shaft showing a snap ring securely fastened around its outer surface and a cut out section on the front end surface of the output shaft.

FIG. 4 illustrates a front view of the PTO stub shaft 12 and the snap ring 24 with tabs 48 fastened on the outer surface of the PTO stub shaft. The front end surface of the PTO output shaft 20 is provided with a cut out section 36 to allow for clearance of the snap ring 24 with tabs 48 as the PTO stub shaft 12 is installed.

From the foregoing, it will be observed that numerous modifications and variations can be affected without departing from the true spirit and scope of the novel concept of the present invention. It will be appreciated that the present disclosure is intended as an exemplification of the invention, and is not intended to limit the invention to the specific embodiment illustrated. The disclosure is intended to cover by appended claims all such modifications as fall within the scope of the claims.

The invention claimed is:

1. A PTO assembly, comprising:
   a PTO output shaft having an internal spline, a PTO output shaft recess;
   a PTO stub shaft having a first recess and an external spline, wherein the external spline is engaged with the internal spline;
   a spring loaded mechanism aligned with the PTO output shaft and the PTO stub shaft; and
   a snap ring, wherein when installing the PTO stub shaft to rotate at a first speed and prior to the PTO stub shaft compressing the spring loaded mechanism, an installation surface and the first recess sandwich the snap ring, and after the PTO stub shaft engages the spring loaded mechanism, the snap ring seats in the PTO output shaft recess, and the snap ring has a pair of tabs extending radially away from the PTO stub shaft in a direction perpendicular to the longitudinal axis of the PTO stub shaft, wherein the PTO output shaft has an axially extending protrusion extending less than 360 degrees of a circumference of the PTO output shaft, wherein the protrusion includes an installation surface, wherein the tabs are disposed in a snap ring tab recess which occupies a remainder of the 360 degrees of the circumference of the PTO output shaft.

2. The PTO assembly of claim 1, wherein the PTO stub shaft further comprises a second recess, wherein when installing the PTO stub shaft to rotate at a second speed and prior to the PTO stub shaft compressingthe spring loaded mechanism, the installation surface and the second recess sandwich the snap ring, and after the PTO stub shaft engages the spring loaded mechanism, the snap ring seats in the PTO output shaft recess.

3. The PTO assembly of claim 2, further comprising a first gear and a second gear, wherein the first and second gears are concentric with the PTO output shaft, the spring loaded mechanism can engage the first gear to rotate the PTO output and stub shafts at the first speed, and the spring loaded mechanism can further engage the second gear to rotate the PTO output and stub shafts at the second speed.

4. The PTO assembly of claim 1, wherein the spring loaded mechanism comprises a spring and a gear collar, wherein the spring and the gear collar are in alignment with the PTO output shaft, the spring urges the gear collar towards the PTO stub shaft.

5. The PTO assembly of claim 4, wherein the spring loaded mechanism further comprises a member concentric with the gear collar, wherein the member is between the PTO stub shaft and the gear collar.

6. The PTO assembly of claim 5, wherein the PTO stub shaft has a first end, and the first end engages the spring loaded mechanism when the first end is installed towards the spring loaded mechanism.

7. The PTO assembly of claim 6, wherein the PTO stub shaft has a second end with a bore, and the shape of the bore is complementary to the shape of the member such that when the bore is installed towards the spring loaded mechanism the second end does not compress the spring loaded mechanism.

* * * * *